Jan. 17, 1967  E. J. NEWILL ETAL  3,299,303
DYNAMOELECTRIC MACHINE WITH INCORPORATED VOLTAGE REGULATOR
Filed Jan. 7, 1963  4 Sheets-Sheet 1

INVENTORS
Arza D. Heiny
Edward J. Newill
Allen E. Beaty
James H. English
BY C. R. Meland
THEIR ATTORNEY Jan. 17, 1967    E. J. NEWILL ETAL    3,299,303
DYNAMOELECTRIC MACHINE WITH INCORPORATED VOLTAGE REGULATOR
Filed Jan. 7, 1963    4 Sheets-Sheet 2

INVENTORS
Arza D. Heiny
Edward J. Newill
Allen E. Beaty
James H. English
BY
C. R. Meland
THEIR ATTORNEY

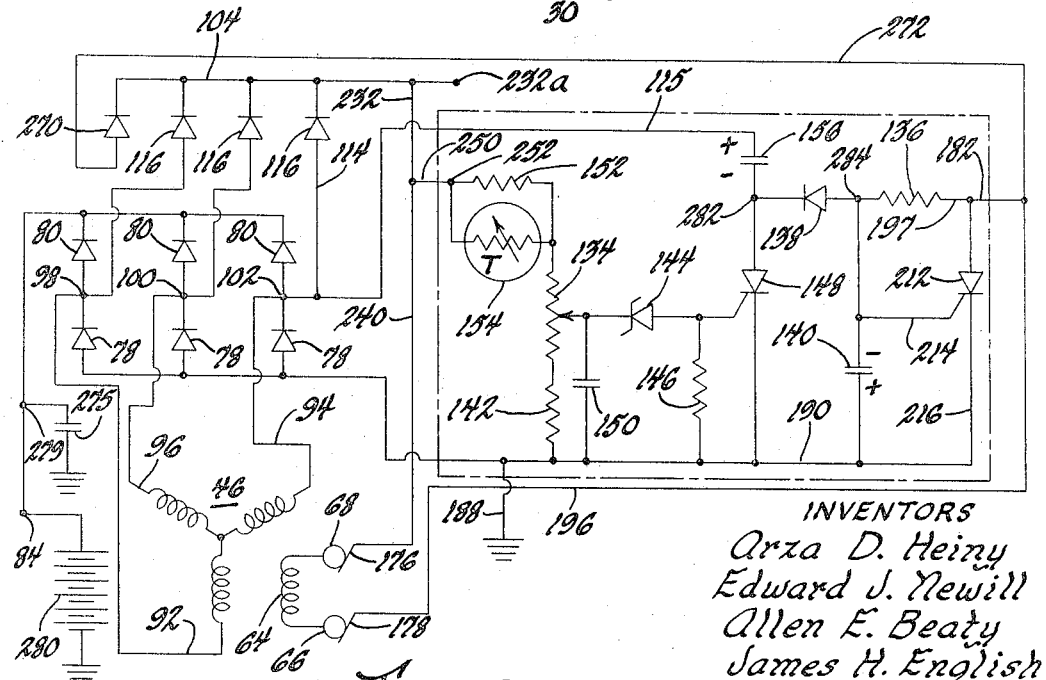

INVENTORS
Arza D. Heiny
Edward J. Newill
Allen E. Beaty
James H. English
BY
C. R. Meland
THEIR ATTORNEY

United States Patent Office 3,299,303
Patented Jan. 17, 1967

3,299,303
DYNAMOELECTRIC MACHINE WITH INCORPORATED VOLTAGE REGULATOR
Edward J. Newill, Pendleton, Allen E. Beaty and James H. English, Anderson, and Arza D. Heiny, Carmel, Ind., assignors to General Motors Corporation, Detroit, Mich., a corporation of Delaware
Filed Jan. 7, 1963, Ser. No. 249,901
2 Claims. (Cl. 310—66)

This invention relates to dynamoelectric machines and more particularly to a dynamoelectric machine that generates an A.C. voltage which is rectified by diodes and has a built-in voltage regulator.

In the past, it has been common practice to regulate generators of the type that are used on motor vehicles by a regulator which is separate from the generator. In such an installation, the regulator unit is located at some distance from the generator and the generator and regulator are connected by wiring in such a manner that the regulator controls the field current of the generator. The generator in such installations can have a commutator or can have its output rectified by diodes. The regulator in many cases has been of the vibrating contact type and in some cases has been of a semiconductor type such as that illustrated in the patent to Short, Re. 24,715.

In contrast to the above-known power systems for motor vehicles, it is an object of this invention to provide a dynamoelectric machine which has a built-in regulator. With this arrangement, it is only necessary to mount the dynamoelectric machine on a motor vehicle and to connect the output terminals of the dynamoelectric machine with the electrical loads such as the storage battery. This eliminates mounting a separate regulator unit and connecting the regulator unit and the generator by external wiring.

Another object of this invention is to provide a generator, which can be used on motor vehicles, that generates alternating current which is rectified to direct current by one or more diodes and wherein the dynamoelectric machine has a built-in semiconductor voltage regulator which may use one or more controlled rectifiers. In carrying this object forward, the diodes and the semiconductor voltage regulator are all mounted within one of the end frames of the generator so that there is no external wiring and the component parts of the combined generator and regulator are protected by the end frame of the generator.

A further object of this invention is to provide a generator that has a built-in voltage regulator and wherein means are provided for cooling the components of the voltage regulator but wherein the size of the dynamoelectric machine is maintained at a minimum such that the single generator-regulator package can be used on motor vehicles. In regard to size, the entire generator-regulator combination of this invention may have, for example, a total length of less than seven inches and a diameter not including mounting lugs of approximately 5½ inches.

Still another object of this invention is to provide a generator which generates an A.C. voltage and wherein this A.C. voltage is rectified by a three phase full wave bridge rectifier network that is built into the generator and wherein the generator has a built-in semiconductor voltage regulator. In carrying this object forward, the diodes that make up the bridge rectifier and the components of the semiconductor voltage regulator are so arranged and positioned that they are effectively cooled but wherein the size of the entire package is still small enough to be effectively used, for example, on passenger cars.

Another object of this invention is to provide a combined voltage regulator and brush-holder assembly which can be accommodated by a dynamoelectric machine and which can be mounted within one end frame of a dynamoelectric machine.

Further objects and advantages of the present invention will be apparent from the following description, reference being had to the accompanying drawings wherein preferred embodiments of the present invention are clearly shown.

In the drawings:

FIGURE 3 is a sectional view taken along line 3—3 of FIGURE 2.

FIGURE 9 is a schematic circuit diagram of the combined generator and regulator of this invention.

Figures 2, 5:
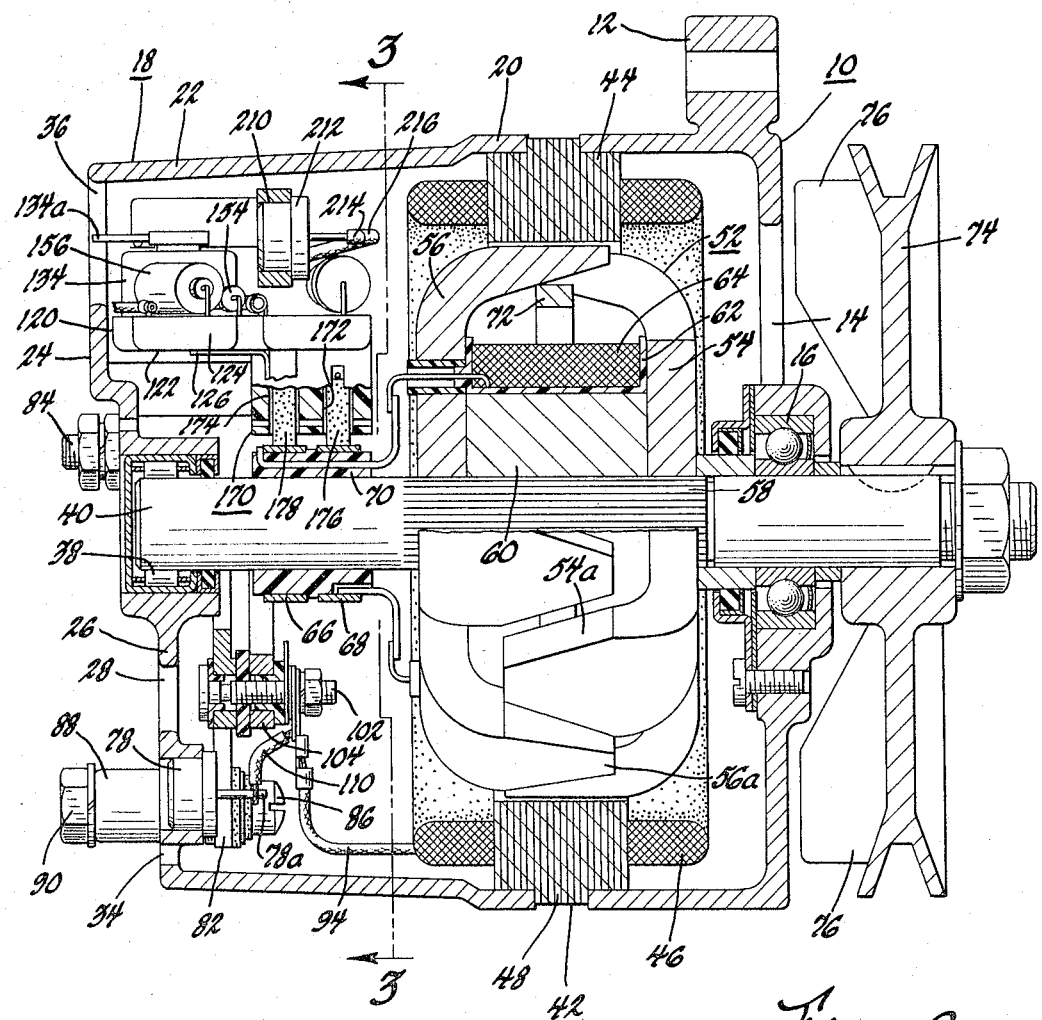
FIGURE 2 is a sectional view taken along line 2—2 of FIGURE 1.
FIGURE 5 is a sectional view taken along line 5—5 of FIGURE 1.

Referring now to the drawings and more particularly to FIGURE 2, the reference numeral 10 designates one of the end frames for the dynamoelectric machine of this invention and this end frame can be formed of a metal material such as die cast aluminum. The end frame 10 has an integral mounting lug 12 and has a plurality of air outlet openings 14. The end frame 10 supports an antifriction bearing 16 which is clearly shown in FIGURE 2.

Figure 1:
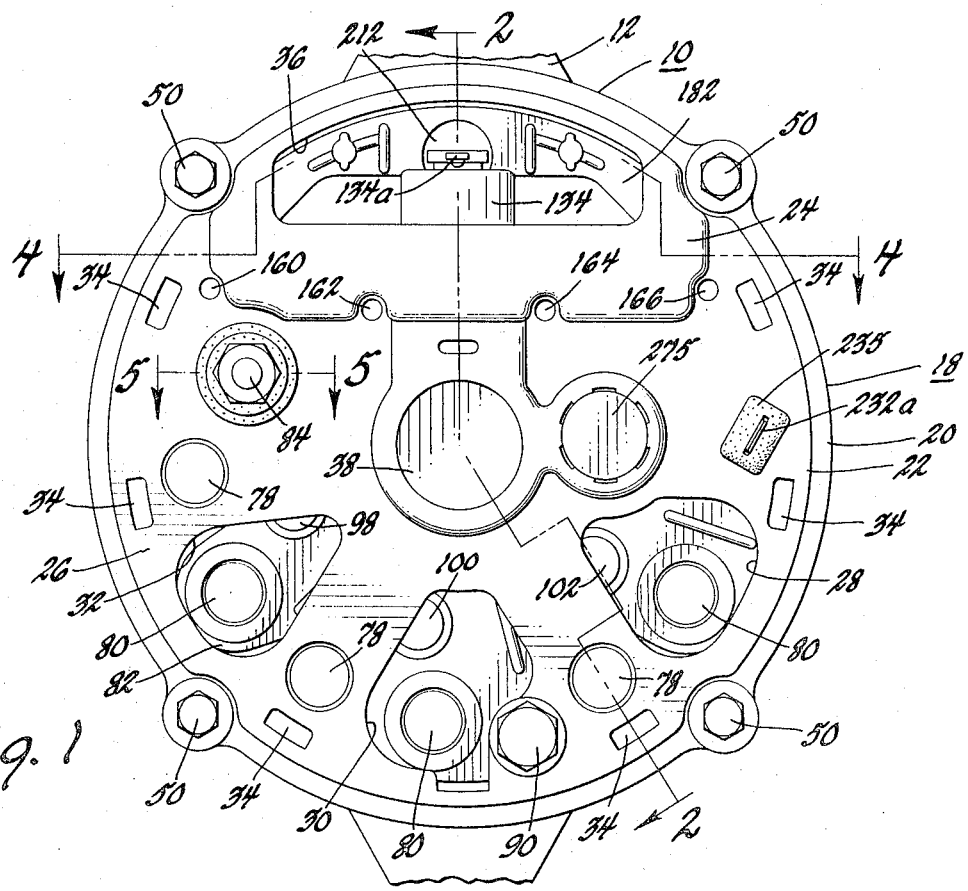
FIGURE 1 is an end view of a dynamoelectric machine made in accordance with this invention.
Figure 4:
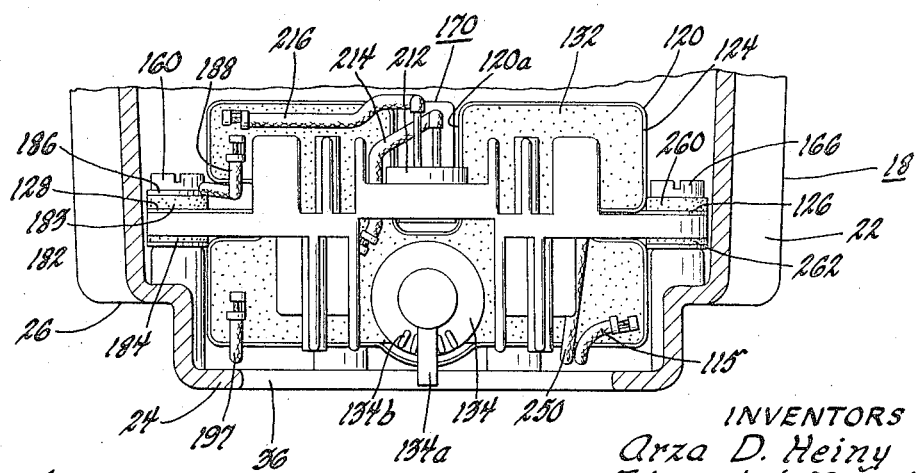
FIGURE 4 is a sectional view taken along line 4—4 of FIGURE 1.

A second end frame generally designated by reference numeral 18 is provided and this end frame like the end frame 12 can be formed of die cast aluminum. The end frame 18 has annular sections 20 and 22 and has end walls 24 and 26. The end wall 24 projects slightly beyond the end wall 26 as is clearly depicted in FIGURE 2. The end wall 26 has air inlet openings 28, 30 and 32 all of which are shown in FIGURE 1. This end wall also has a plurality of air inlet openings 34 which are circumferentially spaced as shown in FIGURE 1. The end wall 24 has an air inlet opening 36 which permits a free flow of air into the area which contains the semiconductor voltage regulator.

The end wall 26 carries an anti-friction bearing 38 and it is seen that a shaft 40 is journalled in the antifriction bearings 16 and 38.

The end frames 10 and 18 support a stator assembly which is generally designated by reference numeral 42. This stator assembly includes a stator core 44 which is formed of laminated steel. The core 44 has a plurality of stator slots which receive the coils of a three phase Y-connected stator winding 46. It is seen that the stator core 44 has some large diameter laminations 48 which are clamped between annular surfaces of the end frames 10 and 18. The end frames 10 and 18 are held together by bolts 50 which pass through the openings in the end frame 18. The ends of these bolts can be threaded into suitable threaded openings formed in the end frame 10.

The shaft 40 forms a part of a rotor assembly which is designated in its entirety by reference numeral 52. This rotor assembly has a pair of rotor segments 54 and 56 which are secured to the shaft 40 by press fitting them on the splined section 58. The segments 54 and 56 are formed of magnetic material and have pole teeth 54a and 56a which interfit but which are spaced from each other. Positioned between the segments 54 and 56 is a core 60 which is formed of magnetic material. The core 60 carries a spool 62 which is formed of insulating material and this spool carries a field coil 64.

The field coil has two end leads which are connected respectively with metal slip rings 66 and 68 carried by an insulator 70 that is press fitted to rotate with the shaft 40. An annular member 72 which is formed of non-magnetic material engages the inner surfaces of the pole teeth 54a and 56a. This member 72 reduces the noise produced by the generator when the rotor 52 is driven at some critical speed.

The shaft 40 is driven by a combined fan and pulley 74 which is keyed to the shaft 40 as shown in FIGURE 2. The combined fan and pulley may be of any well known construction and when the pulley section is driven by a fan belt, the fan blades 76 draw air through the air outlet openings 14 and through the generator in a manner to be more fully described hereinafter.

When the field winding 64 is energized with direct current through the slip rings 66 and 68, an A.C. voltage is generated in the three phase Y-connected stator winding 46 in a manner well-known to those skilled in the art.

The output voltage of the three phase stator winding 46 is rectified to direct current by a three phase full-wave bridge rectifier which now will be described. This bridge rectifier includes three diodes 78 which are mounted in circular openings formed in the end wall 26 of the end frame 18. One of the diodes 78 is depicted in FIGURE 2 in position within an opening formed in the end wall 26. It is seen that there is a boss which extends inwardly of the end wall 26 and forms a continuation for the opening that receives the diode.

The diodes 78 are of well known construction and each diode has an outer metal case which is press fitted respectively within the three openings in the end wall 26. The metal case contains a rectifying junction which may be, for example, a silicon PN junction. One side of the rectifying junction is connected with the metal case whereas the opposite side of the rectifying junction is connected with a projecting terminal 78a which is insulated from the metal case.

It can be seen from the schematic diagram of FIGURE 9 that the anodes of the diodes 78 are connected with the metal case and are therefore electrically connected by the metallic material of the end frame 18. The cathodes of diodes 78 are connected respectively with the projecting terminals 78a as is clearly apparent from the circuit diagram of FIGURE 9.

The other three diodes that make up the three phase full-wave bridge rectifier network are designated by reference numeral 80. These three diodes are identical with diodes 78 with the exception that the metal cases of diodes 80 are connected with the cathodes rather than the anodes. The outer metal cases of the diodes 80 are press-fitted into openings formed in a metal heat sink 82.

The metal heat sink 82 is supported from the end wall 26 of the end frame 18 by bolt 84 and screw 86. The bolt 84 is shown in the sectional view of FIGURE 5 and it is seen that this bolt passes through the metal heat sink 82 and through the end wall 26 of the end frame 18. It is also seen that the bolt 84 is electrically insulated from the end wall 26 and that the metal heat sink 82 is likewise electrically insulated from the metal end wall 26. The bolt carries two nuts which are depicted in FIGURE 5, one of which can be removed to secure a terminal to the bolt. This bolt 84 forms one D.C. output terminal for the dynamoelectric machine which can be connected in a manner illustrated in FIGURE 9.

The screw 86 passes through a portion of the heat sink 82 and is threaded in to the end wall 26 of the end frame 18. The bore which receives the screw or bolt 86 is aligned with a bore in a boss 88 which extends axially from the end wall 26. The boss 88 receives another screw or bolt 90 which is threaded into a bore in this boss and this bolt will be at the same electrical potential as the end frame 18 and can be used as a grounding device. The screw 86 is electrically insulated from the heat sink so that the screw 86 does not electrically connect the metal heat sink 82 and the end wall 26 even through this bolt is threaded into a bore in the end wall 26.

The lead wires coming from the phase windings of the three phase stator winding 46 are designated by reference numerals 92, 94 and 96. The lead wires are connected with terminals that have openings that receive the metal terminal studs 98, 100 and 102.

One of the terminal studs 102 with its associated electrical connections is shown in the sectional view of FIGURE 2. It is seen that the terminal stud 102 passes through an opening formed in the metal heat sink 82 and also passes through an opening formed in another metal heat sink 104. The terminal stud 102 receives a metal terminal that is connected with one of the phase leads 94 and also receives four other metal terminals which are connected with conductors 110, 112 and 114 and 115. The conductor 110 is connected with the projecting terminal 78a of diode 78. The conductor 112 is connected with the projecting terminal 80a of the diode 80. The conductor 114 is connected with the projecting terminal 116a of a diode 116. The terminal stud 102 as can be seen from FIGURE 2, is electrically insulated from the metal heat sinks 82 and 104 and forms a common support for the metal terminals that are attached respectively to conductors 94, 110, 112, 114 and 115. The terminal studs 98 and 100 perform the identical function as the terminal stud 102 with the exception that these terminal studs do not support the end of a conductor of the type designated by reference numeral 115, but do support terminals connected with conductors that perform the same function as conductors 94, 110, 112 and 114.

The three terminal studs 98, 100 and 102 support the metal heat sink 104. This metal heat sink carries three diodes 116. The diodes 116 each have an outer metal case which is press fitted or otherwise secured in openings formed in the metal heat sink 104. The metal case of the diodes 116 is the cathode so that metal heat sink 104 forms a common electrical connection for the cathodes of the diodes 116. The anodes of diodes 116 are connected respectively with the terminal studs 98, 100 and 102 in a manner as was described above in describing the terminal stud 102. This is readily apparent from an inspection of the schematic circuit diagram of FIGURE 9 and from an inspection of FIGURE 3.

Figure 8:
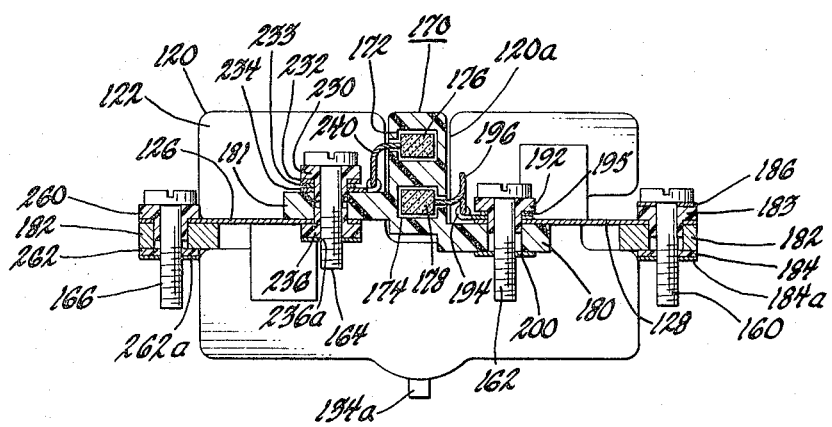
FIGURE 8 is a view partly in section of a combined brushholder and semiconductor voltage regulator which forms a component part of the dynamoelectric machine of this invention.

The voltage regulator of this invention is mounted within the end frame 18 and is secured to the end wall 24. This voltage regulator includes a metallic housing or printed circuit retainer 120 which has a bottom wall 122 and a side flange 124. This metal housing 120 is generally trough-shaped and the outline of this part is shown in FIGURE 8. A pair of metal brackets 126 and 128 are welded or otherwise secured to the bottom wall 122 and extend normal to this wall.

Figures 6, 7:
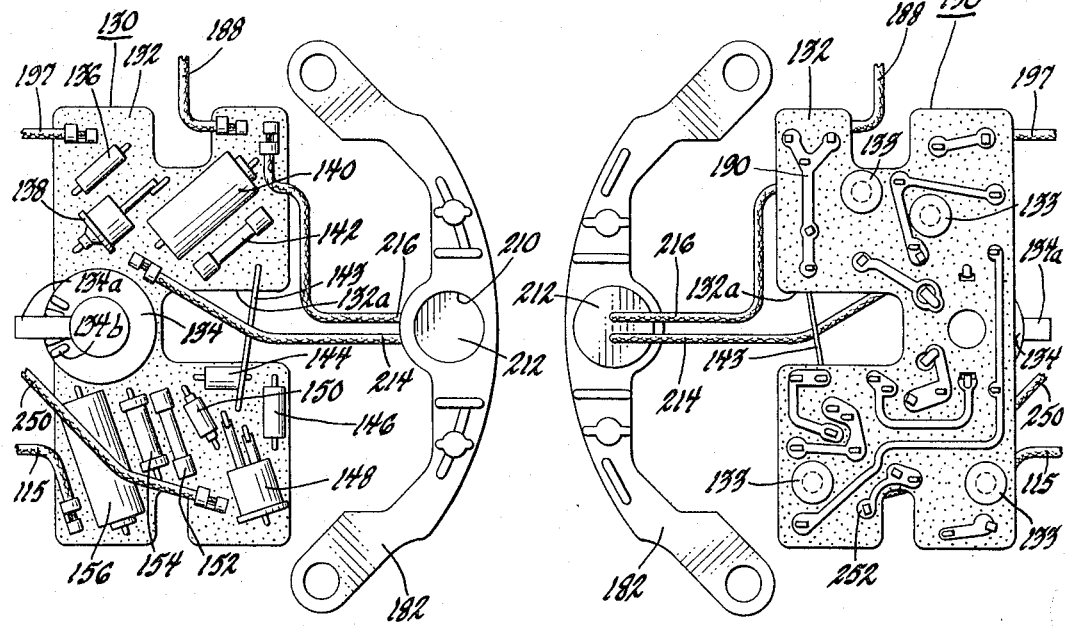
FIGURE 6 is a plan view of a printed circuit board and heat sink which form component parts of the semiconductor voltage regulator of this invention.
FIGURE 7 is a plan view of the printed circuit board and heat sink illustrated in FIGURE 6 but showing the opposite side of these components.

The housing 120 receives a printed circuit board which is generally designated by reference numeral 130 and which is shown in FIGURES 6 and 7. The printed circuit board 130 comprises an insulating board 132 which has printed circuit conductors on one side thereof which are illustrated in FIGURE 7 and which has circuit components for the voltage regulator mounted on an opposite side of the board as depicted in FIGURE 6. The components mounted on the insulating board 132 include a potentiometer resistor 134, a resistor 136, a silicon rectifier 138, a capacitor 140, a resistor 142, a conductor 143, a Zener diode 144, a resistor 146, a controlled rectifier 148, a capacitor 150, a resistor 152, a thermistor 154, and a capacitor 156. The end leads for these components are connected to the printed circuit conductors on the opposite side of the printed circuit board 130 by passing the end leads of these components through the printed circuit board and then soldering or otherwise securing them to the various printed circuit conductors. The connections between the components and the various printed circuit conductors can be readily traced by comprising FIGURES 6 and 7.

The metal brackets 126 and 128 have openings which receive the fasteners or screws 160, 162, 164 and 166 shown in FIGURE 8. These screws are eventually threaded openings formed in the end wall 26 of the end frame 18. Before these screws or fasteners are threaded into the end wall of the end frame, they serve to connect the voltage regulator of this invention with a brushholder.

The brushholder is generally designated by reference numeral 170 and is formed as a one-piece plastic part. This part has compartments 172 and 174 which respectively receive the brushes 176 and 178 and their brush springs. This one-piece plastic molding has projecting sections 180 and 181 which engage opposite sides of the metal brackets 126 and 128. It is also seen that the part of the brushholder that contains the brushes is positioned in a slot 120a which is formed when the metallic housing or retainer 120 is made.

It is seen from FIGURES 6 and 7 that the insulator board 132 has a slot 132a which is complementary to the slot 120a. When the printed circuit assembly 130 is assembled within the trough-shaped housing 120, the slot 132a fits around the slot 120a. The printed circuit board 130 carries a plurality of spacers 133 which are formed of insulating material and which space the printed circuit conductors away from the bottom of the metal housing 120 when the printed circuit assembly is fitted into this housing. The housing can be filled with a potting compound or a suitable adhesive to secure the printed circuit assembly 130 to the bottom of the metal housing 120 with the spacers 133 insuring that the printed circuit conductors will not touch the bottom wall of the metal housing 120.

It can be seen from FIGURE 8 that the fastener screw 160 passes through a metal terminal 186, an insulating bushing 183, a metal heat sink 182 and is threaded into a steel retaining washer 184a which abuts an insulator 184. The retaining washer serves as a means for holding the various parts of the FIGURE 8 assembly together prior to the securing of the assembly to the end wall 24 of end frame 18. It is seen that the screw 160 passes through the metal bracket 128 but is insulated from this bracket and is insulated from the metal heat sink 182. It is also seen that the head of screw 160 contacts the metal terminal 186 which is connected with a conductor 188. It can be seen from FIGURES 6 and 7 that the conductor 188 is connected with the printed circuit conductor 190.

The fastener screw 162 passes through an insulator 192 which is fitted into an opening in the bracket 128 and an opening in the part 180 of the brushholder. The insulator 192 supports metal terminals 194 and 195. The metal terminal 194 is connected with brush 178 via conductor 196. Terminal 195 is connected with conductor 197. This screw 162 is initially threaded into a retaining device 200 to once more aid in holding the subassembly shown in FIGURE 8 together. The terminal clip 194 engages and is therefore electrically connected with the metal bracket 128. The brush 178 is therefore at the same electrical potential as the metal bracket 128. Since the metal heat sink 182 abuts the bracket 128, the brush 178 is at the same electrical potential as the heat sink 182.

The metal heat sink 182 has an opening 210 which receives the outer metal case of a controlled rectifier 212. The outer metal case of this controlled rectifier is the anode of the controlled rectifier and the gate and cathode of this controlled rectifier are connected respectively with conductors 214 and 216 which are depicted in FIGURES 6 and 7. From the foregoing, it will be appreciated that the brush 178 is connected with the anode of controlled rectifier 212 via conductor 196, terminal 194, bracket 128 and heat sink 182.

The metal fastener 164 passes through an insulator 230 which is positioned within an opening formed in section 181 of the brushholder. This insulator passes through a flat metal conductor 232 and through metal terminal clips 233 and 234. The fastener 164 passes through an insulator 236 and is threaded into a steel retainer washer 236a. The terminal clip 234 is connected with the brush 176 via the conductor 240. This terminal clip 234 engages terminal 233 which in turn engages flat metal conductor 232. This flat metal conductor 232 is electrically connected with the metal heat sink 104 which carries the diodes 116. The brush 176 is thus electrically connected to one side of the diodes 116 by means of the flat metal conductor 232. This flat metal conductor 232 has a right angle portion 232a which forms a male terminal and which passes through an insulator 235 located in an opening formed in end wall 26 of end frame 18.

The metal terminal clip 233 is connected with a conductor 250. The conductor 250 is connected with the printed circuit conductor 252 which in turn is connected to one side of the thermistor 154 and to one side of resistor 152. From the foregoing, it can be seen that the fastener 164 and insulator 230 serve as a support for the conductors 240 and 250 and the metal strap 232 all of which is depicted in the schematic circuit diagram of FIGURE 9.

The metal fastener 166 passes through an insulating bushing 260, the metallic bracket 126, the metal heat sink 182, an insulator 262 and is threaded into a steel retaining washer 262a which serves to initially secure the subassembly of FIGURE 8 together before the entire subassembly is secured to the end frame 18. There are no electrical connections made at the fastener 166 since it is insulated from the bracket 126 and the heat sink 182.

The metal heat sink 104 which is illustrated in FIGURE 3 carries a diode 270 which has an outer metal case that is press fitted or staked into an opening formed in the metal heat sink 104. The cathode of diode 270 like the cathodes of diodes 116 is the metal case and its cathode is therefore connected to the metal heat sink 104. The anode of the diode 270 is connected with conductor 272 and this conductor is connected with a terminal clip 274. This terminal clip 274 fits around the insulator 192 and is therefore electrically connected with terminal clip 194 and terminal clip 195. The terminal clip 274 can be slipped over the insulator 192 just prior to assembly of the subassembly of FIGURE 8 to the end frame 18.

As was pointed out above, the subassembly of FIGURE 8 is held together by the retaining washers 184a, 200, 236a and 262a prior to screwing fasteners 160, 162, 164 and 166 into threaded holes formed in the end frame 18.

A capacitor 275 is fitted into an opening formed in a boss which projects from the end wall 26 of end frame 18. The capacitor has a lead 277 which is connected to the metal heat sink 82 by a fastener 279.

The terminal 232a can be connected with an indicator light which will indicate whether or not the generator is developing its required output voltage. Thus a signal lamp can be connected between the male terminal 232a and the positive side of the battery 280 through a suitable switch (not shown). It thus will be seen that with such a circuit arrangement, the field 64 can be initially energized through the signal lamp by closing the switch. In addition, the signal lamp will be extinguished when the generator comes up to its output voltage but will be energized when the generator is not developing a predetermined output voltage. A resistor can be connected in parallel with the signal lamp if so desired.

The regulator circuit which is shown in FIGURE 9 is substantially identical with the regulator circuit disclosed and claimed in copending application, Serial No. 215,187, filed on August 6, 1962, and assigned to the assignee of this invention.

The operation of the combined generator and regulator will now be described. When the field winding 64 is energized through a suitable circuit from the battery 280, the generator begins to develop an output voltage which is rectified to direct current by the bridge rectifier which includes diodes 78 and 80. The output voltage of this bridge rectifier is used to feed the loads on the motor vehicle including the storage battery 280 which is connected across the D.C. output terminals of the bridge rectifier that includes diodes 78 and 80.

After the generator has built up to some output voltage, the field current for the field coil 64 is controlled by the controlled rectifier 212. The circuit for the field can be traced from heat sink 104, through conductor 232, through conductor 240, through brush 176 and slip ring 68 to the field winding 64, through the field winding 64, through slip ring 66 and brush 178, through conductor 196, through conductor 182, through the anode-cathode circuit of controlled rectifier 212, through conductor 216, and then to the conductor 190. It is pointed out here that the controlled rectifier 212 is of a type that can be switched on and off by varying the gate voltage of this controlled rectifier. In addition, this controlled rectifier can be switched off even when the anode voltage is positive with respect to the cathode and during the time that the cathode is positive with respect to the gate electrode. This type of controlled rectifier is sometimes termed a PNPN silicon gate controlled switch since the rectifier can be completely controlled by varying the gate voltage.

The controlled rectifier 148 on the other hand is of a standard type wherein the gate electrode does not have complete control of the conduction of this controlled rectifier. This controlled rectifier could, however, be of the same type as controlled rectifier 212.

When the output voltage of the generator increases above its desired regulated value, the Zener diode 144 will break down in a reverse direction. This occurs when the voltage that appears between junction 164 and ground is greater than a desired regulated value. When Zener diode 144 breaks down, current flows through it in a reverse direction and flows through the resistor 146 to ground. Current also flows from the gate electrode of controlled rectifier 148 to the cathode electrode and to ground. As a result of this, the controlled rectifier 148 is turned on in its anode-cathode circuit.

It is pointed out that the voltage being applied to conductor 115 is the same voltage that appears at junction 102 between diodes 78 and 80. This voltage varies between positive and negative values and provides a pulsating direct current. On the negative swing of this voltage, the voltage may actually go to some small value below ground potential and then swing to a predetermined positive potential with respect to ground.

When the Zener diode 144 is conducting to turn on controlled rectifier 148, the capacitor 156 will be charged through controlled rectifier 148 with the polarity shown on the drawing when the voltage at junction 102 goes positive. When the voltage at junction 102 now goes negative, the voltage of the anode of controlled rectifier 148 will go to a potential that may be, for example, 12 volts less than ground potential in a twelve volt system due to the charged condition of capacitor 156. When this occurs, it can be seen that the cathode of controlled rectifier 148 is now at a higher potential than its anode and the controlled rectifier 148 will therefore be turned off.

When the junction 282 is driven below ground potential, the capacitor 156 will discharge to turn off the controlled rectifier 212. This discharge path is from the top side of capacitor 156, through conductor 115, through a diode 80, through battery 280 to ground, through the cathode of controlled rectifier 212, through the gate electrode of controlled rectifier 212 to the junction 284, and then through diode 138 to the opposite side of the capacitor 156. It can seen that this potential which was accumulated by the capacitor 156 is of such a value as to instantaneously drive the cathode of controlled rectifier 212 to a potential which is positive with respect to the gate electrode. This causes the controlled rectifier 212 to turn off in its anode-cathode circuit which turns off the field current for field winding 64 with a consequent reduction in the output voltage of the dynamoelectric machine. When the output voltage reduces, the voltage appearing across the voltage divider network from junction 252 to ground reduces so that this voltage is lowered to the point where Zener diode 144 no longer conducts enough to provide a bias to maintain controlled rectifier 148 turned on. The controlled rectifier 148 will therefore be turned off.

When capacitor 156 discharges, the capacitor 140 is charged from capacitor 156 through a circuit that includes diode 138 to the polarity shown to maintain the controlled rectifier 212 turned off until the output voltage of the generator rectifier combination has dropped to a point to maintain the controlled rectifier 212 turned off.

The foregoing is only a description of one short cycle of operation of the voltage regulator of this invention. The voltage regulator will repeat this one cycle constantly during operation of the electrical system. In other words, the controlled rectifiers 148 and 212 are constantly switched on and off so that an average D.C. current flows through the field winding 64 to maintain the output voltage of the generator bridge rectifier combination substantially constant.

The potentiometer resistor 134 inclures an arm 134a which is formed of a plastic material. This arm can be adjusted to vary the resistance of the potentiometer. This arm has a section which engages a plurality of ribs 134b to hold the arm in its adjusted position.

When the dynamoelectric machine of this invention is in operation, it will be appreciated that the fan blades 76 cause air to flow through the machine to cool the various parts of the machine. This air enters the machine through air inlet openings 28, 30, 32, 34 and 36 all of these openings being formed in the end frame 18. The air exits through air outlet openings 14 formed in the end frame 12. The air that enters the air inlet opening 36 will cool the metal heat sink 182 and the controlled rectifier 212 which is fitted in an opening in this heat sink. This air will also cool the components of the printed circuit board shown in FIGURE 6 since they are positioned in the stream of incoming air. The air that enters the inlet openings 34 will be conveyed past the stator winding 46 to cool it and the air that enters inlet openings 28, 30 and 32 will serve to cool the heat sinks 82 and 104 and the diodes mounted on these heat sinks. It can be seen that the air that cools the heat sinks 82 and 104 and the air that cools the voltage regulator will also be conveyed along the stator winding 46 to cool it.

It is pointed out that the only external electrical connections that need be made with the dynamoelectric machine of this invention are connections to the electrical loads and a connection to an indicator light if this is desired from terminal 232a. In other respects, all of the connections between the diodes, field winding and voltage regulator are made entirely within the dynamoelectric machine as has been pointed out in the description of this invention. It also will be appreciated that the voltage regulator is protected by the end frame 18 and is located entirely within this end frame.

The entire generator-regulator combination is made in a compact size by mounting the various components of the machine on opposite sides of the shaft 40. Thus the diodes and their heat sinks are mounted on one side of the shaft whereas the voltage regulator and the brushholder are mounted on an opposite side of the shaft. This provides a compact power unit but one in which the component parts are effectively cooled to insure long life operation. In this regard, it is noted that there are no electrical switch contacts used in the dynamoelectric machine with the exception of the brushes and slip rings and the machine is therefore a static type.

Although the voltage regulator of this invention uses controlled rectifiers, it will be appreciated that transistors could be used in place of the controlled rectifiers and that this invention comprehends a generator-regulator combination wherein a transistor regulator would be built into the end frame 18.

While the embodiments of the present invention as herein disclosed, constitute a preferred form, it is to be understood that other forms might be adopted.

What is claimed is as follows:

1. A dynamoelectric machine comprising, housing means defining a compartment, a stator assembly including a stator winding disposed within said compartment, a field winding, a rotor member for causing an A.C. voltage to be generated in said stator winding when said field winding is energized with direct current and when said rotor member is rotating, rectifier means disposed within said compartment for converting the A.C. output of said stator winding to direct current, a support member having a bracket portion located within said compartment, semiconductor voltage regulating means disposed within said compartment, electrical connections connecting said voltage regulating means with said field winding and with the output terminals of said rectifier means, said electrical connections being made within said compartment, said semiconductor voltage regulating means including a metal heat sink which supports a semiconductor switch means that is positioned in thermal transfer relationship with said metal heat sink said metal heat sink secured to the bracket portions of said support member.

2. A dynamoelectric machine comprising, housing means defining a compartment, a stator winding disposed within said housing means, a rotor member rotatable with respect to said housing means including a field winding which is electrically connected with slip rings, rectifier means disposed within said compartment and electrically connected with said stator winding for converting the A.C. output of said stator winding to direct current, a combined brushholder and semiconductor voltage regulating means disposed within said compartment and supported by said housing means, said combined brushholder and semiconductor voltage regulating means including a support member, a brushholder and a metal heat sink, a semiconductor switch means supported by said metal heat sink, a printed circuit board supported by said support member, brushes supported by said brushholder which are engageable with said slip rings, fastener means for securing said brushholder support member and metal heat member to said housing means, and electrical connecting means disposed within said compartment for electrically connecting said rectifier means with said combined brushholder and semiconductor voltage regulating means.

References Cited by the Examiner

UNITED STATES PATENTS

| | | | |
|---|---|---|---|
| 2,550,013 | 4/1951 | Kureth | 310—68 |
| 3,041,484 | 6/1962 | Freer et al. | 310—68 |
| 3,077,558 | 2/1963 | Byles | 310—68 |
| 3,168,693 | 2/1965 | Eckenfelder | 322—28 |

MILTON O. HIRSHFIELD, *Primary Examiner.*

A. J. ROSSI, J. D. MILLER, *Assistant Examiners.*